United States Patent [19]
Schadewald et al.

[11] Patent Number: 6,041,818
[45] Date of Patent: Mar. 28, 2000

[54] VALVE ASSEMBLY

[75] Inventors: Christopher E. Schadewald, Whitehouse; Michael P. Wells, Holland, both of Ohio

[73] Assignee: Aeroquip Corporation, Maumee, Ohio

[21] Appl. No.: 09/139,585

[22] Filed: Aug. 25, 1998

Related U.S. Application Data

[60] Provisional application No. 60/082,829, Apr. 23, 1998.

[51] Int. Cl.⁷ ..................................................... F16L 37/28
[52] U.S. Cl. ................................ 137/614.19; 137/614.05; 251/264
[58] Field of Search ......................... 137/614.05, 614.03, 137/614.19, 614.04; 251/264

[56] References Cited

U.S. PATENT DOCUMENTS

| | | | |
|---|---|---|---|
| 1,063,334 | 6/1913 | Donnelly | 137/637.2 |
| 1,099,418 | 6/1914 | Aughenbaugh | 137/637.2 |
| 1,236,372 | 8/1917 | Hitchcock | 137/637.2 |
| 2,549,075 | 5/1951 | Fox | 277/8 |
| 2,835,274 | 5/1958 | Javes | 137/637.2 |
| 3,714,968 | 2/1973 | Billeter | 137/596.2 |
| 3,721,264 | 3/1973 | Coughlin | 137/596.2 |
| 3,765,450 | 10/1973 | Meges | 137/596.2 |
| 3,933,174 | 1/1976 | Kanomata | 137/557 |
| 3,982,561 | 9/1976 | Harthun | 137/596.2 |
| 5,139,049 | 8/1992 | Jensen et al. | 137/614.05 |
| 5,179,976 | 1/1993 | Boland et al. | 137/614.06 |
| 5,339,862 | 8/1994 | Haunhorst | 137/614.05 |
| 5,370,359 | 12/1994 | Sadegh et al. | 137/614.19 X |
| 5,415,200 | 5/1995 | Haunhorst et al. | 137/614.05 |
| 5,586,748 | 12/1996 | Kish | 137/614.05 X |

FOREIGN PATENT DOCUMENTS

WO 98/26203   6/1998   WIPO .

*Primary Examiner*—Kevin Lee
*Attorney, Agent, or Firm*—Emch, Schaffer, Schaub & Porcello, Co., L.P.A.

[57] ABSTRACT

A valve assembly includes (1) a process valve having an axially adjustable valve stem positioned in a passageway thereof and (2) a service valve for receiving and retaining a male end of the process valve. The valve stem has a poppet mounted for axial movement therein between a first axial position closing the valve stem and a second axially position opening the valve stem. The service adapter has an axially extending pin movable from a retracted position to an extended position engaging and opening the poppet of the axially adjustable valve stem.

21 Claims, 12 Drawing Sheets

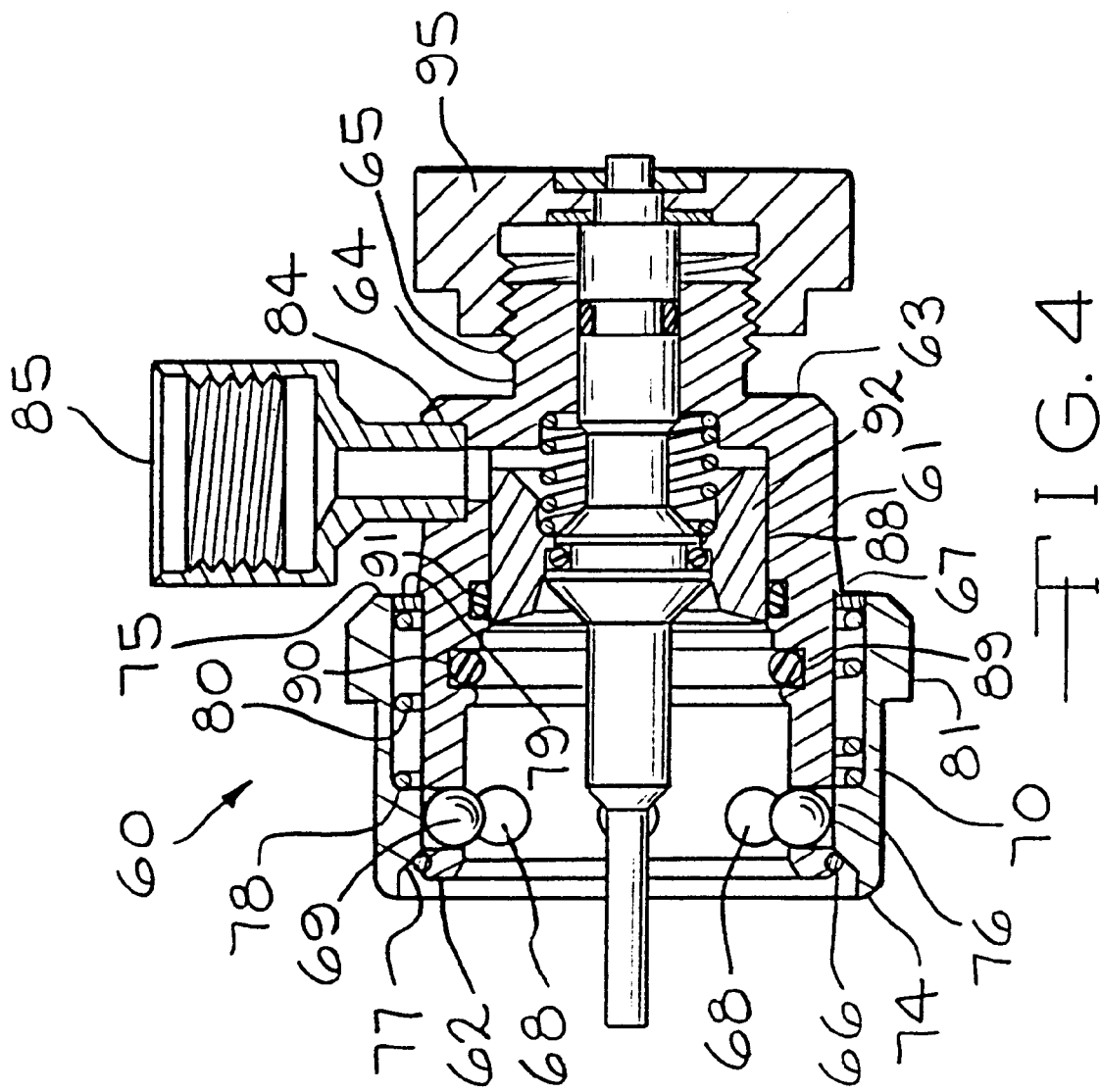

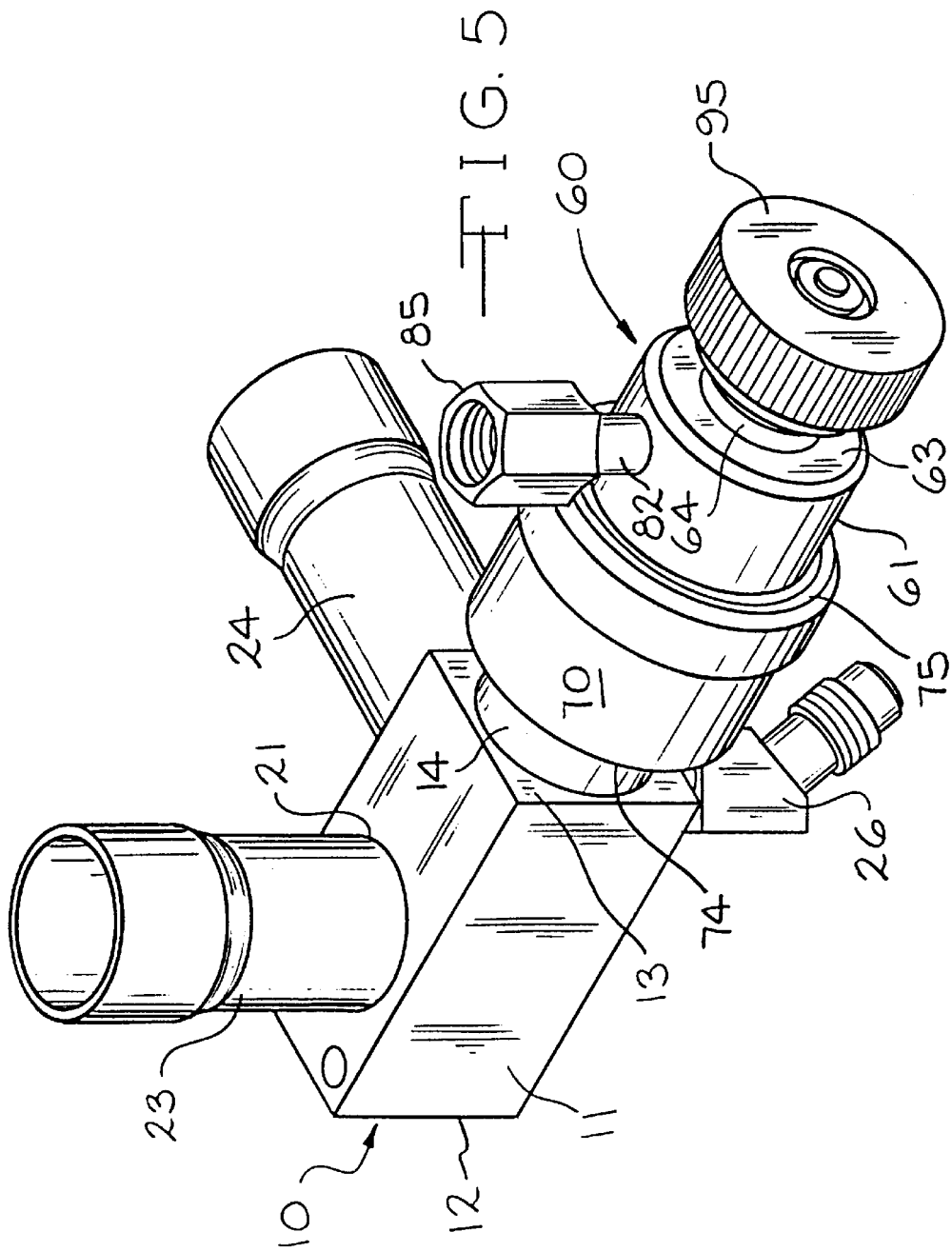

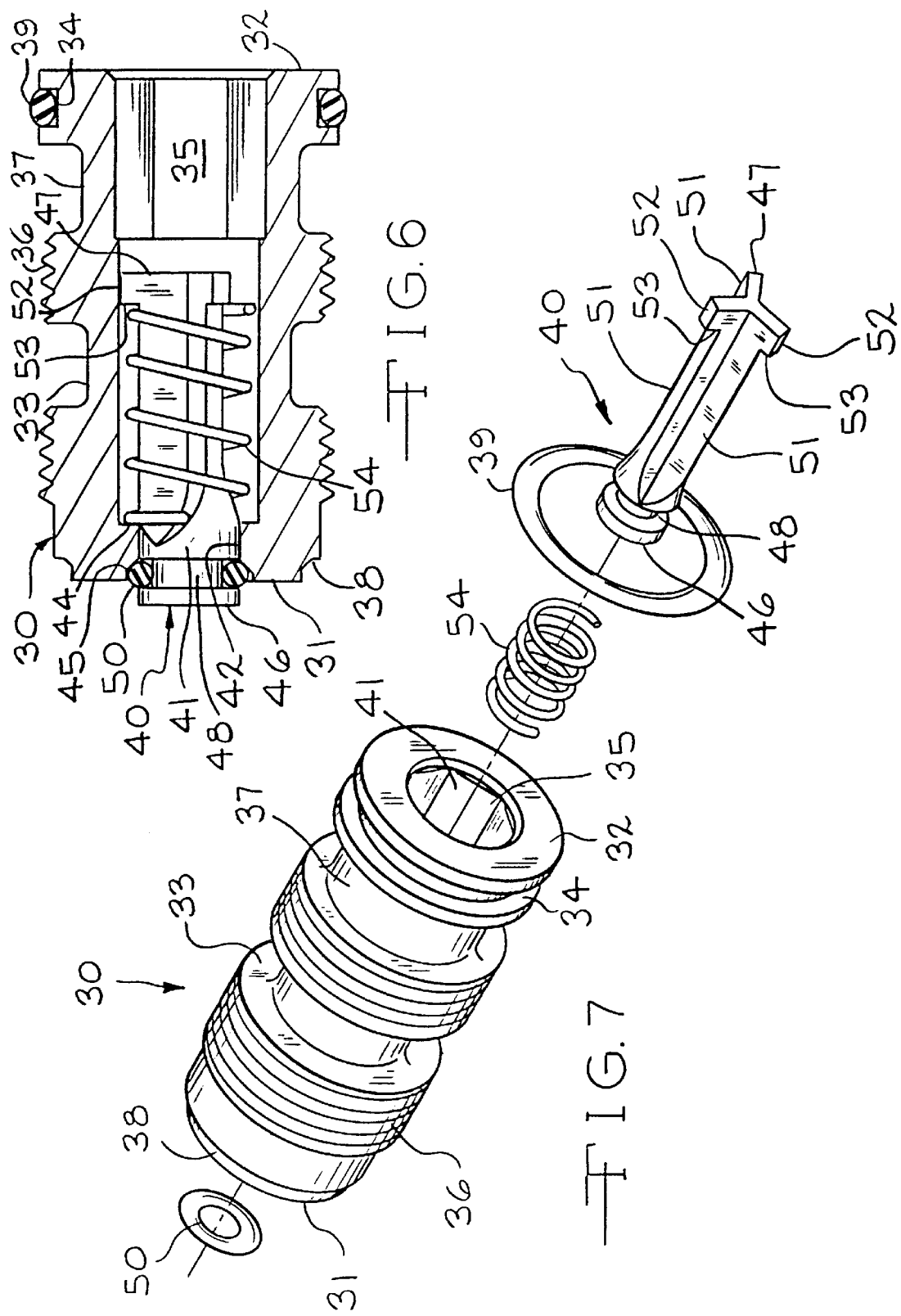

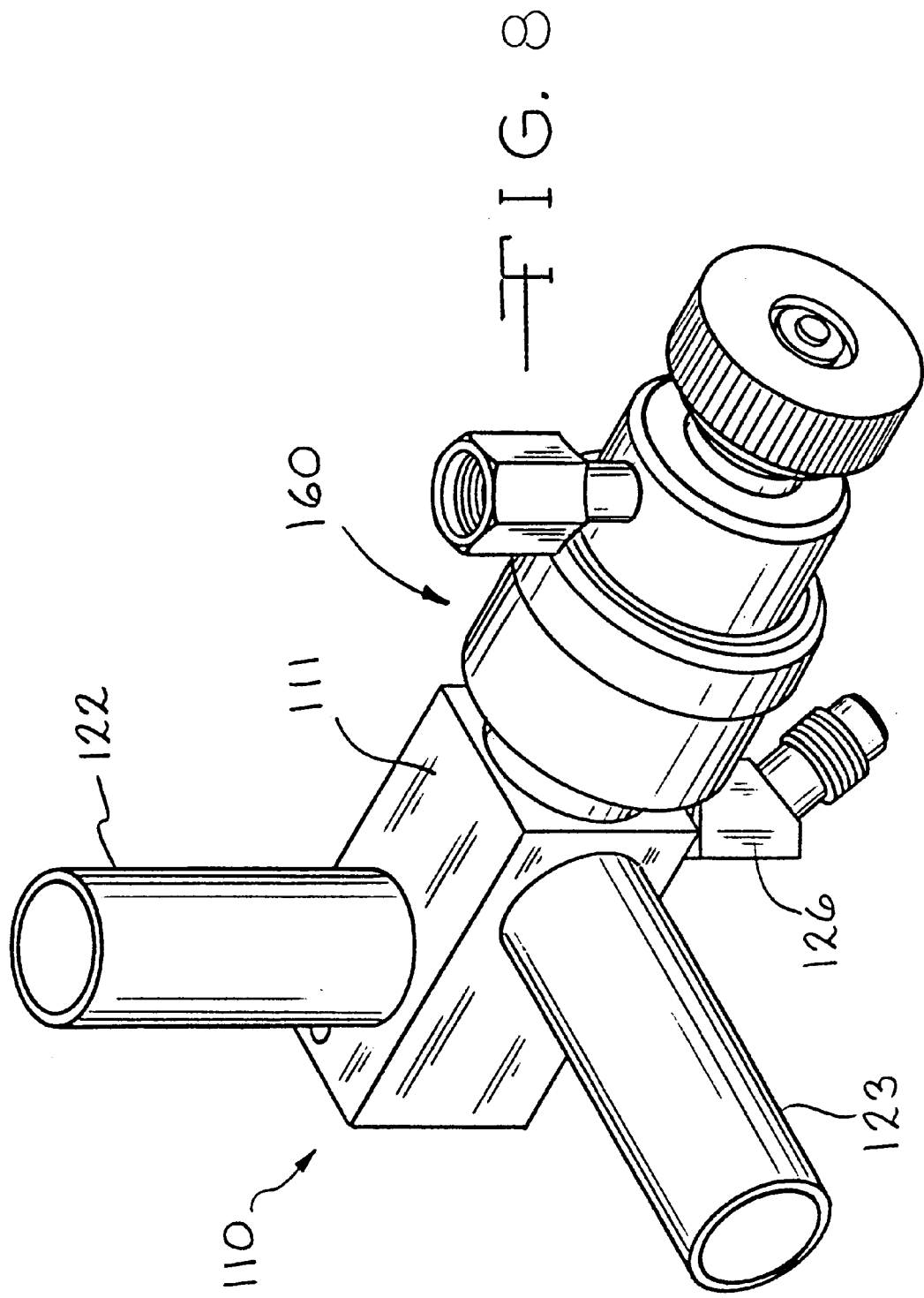

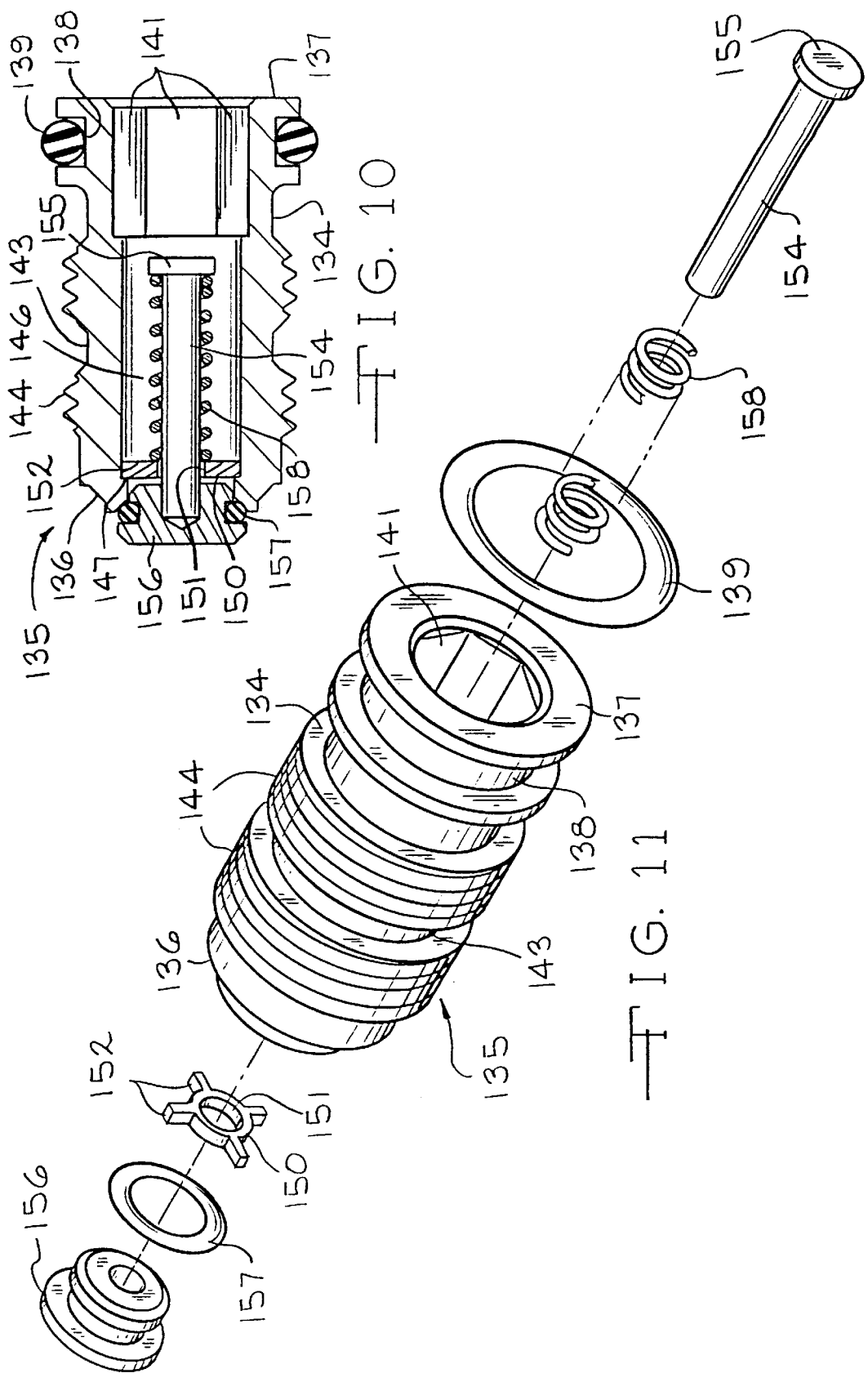

6,041,818

VALVE ASSEMBLY

This application claims Provisional application 60/082829, filed Apr. 23, 1998.

DESCRIPTION

1. Background of the Invention

The present invention is directed to a valve assembly including a service valve having a quick release feature for engagement with and actuation of a process valve of the type used for an HVAC system. The present invention is particularly useful with a valve-in-valve type process valve in which a valve core in a chamber of a valve body controls fluid flow. Reference is made to U.S. patent application Ser. No. 08/762,896 filed Dec. 10, 1996 in the name of Danny D. Beaver, International Application No. PCT/US97/21481 filed Nov. 20, 1997, International Publication No. WO 98/26203 published Jun. 18, 1998, the disclosure of which is incorporated herein by reference.

SUMMARY OF THE INVENTION

The present invention includes (1) a process valve having an axially adjustable valve stem positioned in a passageway thereof, said valve stem being axially moveable in such passageway and having an axially moveable poppet yieldingly urgable from a first axial position closing the valve stem to a second axial position opening the valve stem and (2) a service valve having a quick release type latch or threaded screw type connection at the entrance end for receiving and retaining a male end of such process valve. The service adapter has an axially extending pin moveable from a retracted position to an extended position engaging and opening the poppet of the axially adjustable valve stem. The axially extending pin has an enlarged area sealingly engaged to a slideable sleeve which is moveable a portion of the axial distance moved by the pin to thereby maintain a seal during initial axial movement of the pin. Upon the slidable sleeve reaching a stop shoulder, for example the leading end of the process valve male end, continued movement of the axial pin (1) opens the seal between the enlarged area and the slideable sleeve and (2) opens the poppet of the adjustable valve stem. The quick release latch could be one of a number of different types of latches such as a ball latch, an arc latch or a bar/pin latch.

IN THE DRAWINGS

FIG. 4 is a sectional view of the service valve member with one embodiment of quick release engagement member.

FIG. 5 is a perspective view of the process valve and service adapter connected thereto.

FIG. 6 is a sectional view of the valve stem portion of the process valve showing its valve-in-valve poppet in a sealed position.

FIG. 7 is an exploded perspective view of the valve stem of FIG. 6.

FIG. 8 is a perspective view of a modified process valve and service adapter connected thereto.

FIG. 10 is an enlarged sectional view of the valve stem portion of the modified process valve of FIG. 8.

FIG. 11 is an exploded perspective view of the modified valve stem of FIG. 10.

DETAILED DESCRIPTION OF THE DRAWINGS

Figure 1:
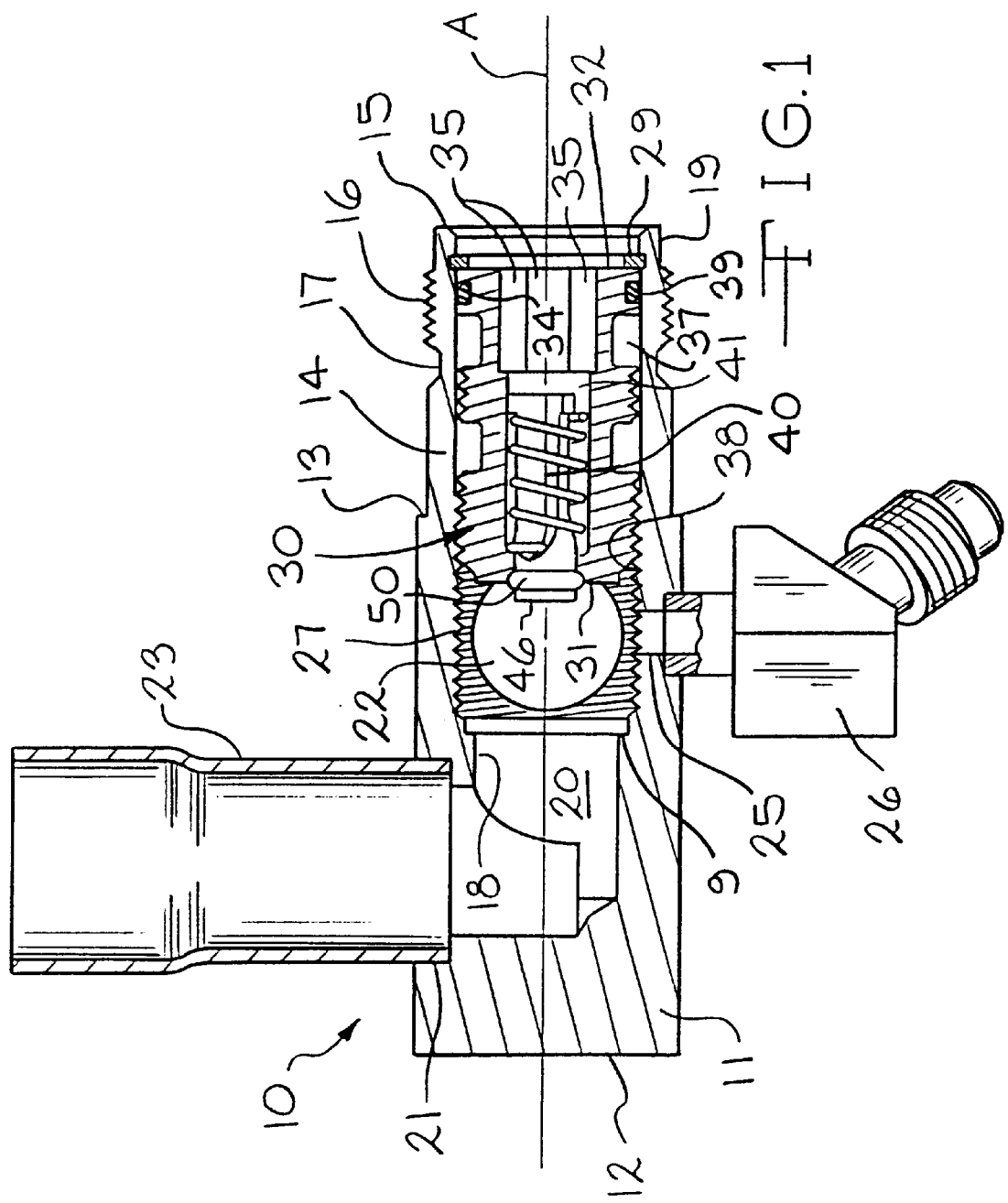
FIG. 1 is a sectional view of the process valve showing the primary valve stem in the open position and the secondary valve-in-valve poppet in the closed position.

Referring to FIGS. 1 through 7, there is shown a male member such as a process valve generally designated by the numeral 10 having a housing 11 extending along an axis A from a closed first end 12 to a second end 13 from which extends a tubular extension 14 having an open end 15 and outwardly facing threads 16 spaced a short distance from the open end 15. On the opposite side of the threads 16 from the open end 15 is an outwardly facing annular groove 17. Between the threads 16 and the open end 15 is an outwardly facing cylindrical wall surface 19.

Internally, the housing 11 has a central chamber 20 communicating with the tubular extension 14 and its open end 15. A first process opening 21 is formed in one wall of the housing 11 and a second process opening 22 is formed in a second wall of the housing 11 with both the first process opening 21 and a second process opening 22 communicating with the chamber 20. The chamber 20 has a reduced size or constricted area 18 communicating with the first process opening 21 from the area communicating with the second process opening 22. A shoulder 9 having a sealing edge or sealing surface extends between the reduced size constricted area 18 and the larger area. A first length of conduit 23 may be brazed or otherwise connected to the first process opening 21 for communication with the factory installed portion (factory side) of an HVAC system. A second length of conduit 24 for attachment to the field side of a HVAC system is brazed or otherwise connected to the second process opening 22. The housing also includes an aperture 25 communicating with the chamber 20 and a Schrader valve 26 attached thereto.

The housing 11 and a portion of the tubular extension 14 have internal threads 27 and an inwardly facing annular groove 28 in which is positioned a retaining ring 29.

Positioned within the chamber 20 of the housing 11 is a valve stem 30 having outwardly facing threads 36 engaged to the internal threads 27 of the housing 11. The valve stem 30 extends along the axis A from a sealing end 31 to an adjustment end 32 and has formed therein an outwardly facing annular fluid flow channel 33. An annular thread relief 37 is formed between the end of the threads 36 and the adjustment end 32. An outwardly facing annular groove 34 is positioned between the thread relief 37 and the adjustment end 32 and has an annular seal 39 positioned therein to effect an annular seal between the valve stem 30 and the internal surface of the housing 11.

Figure 2:
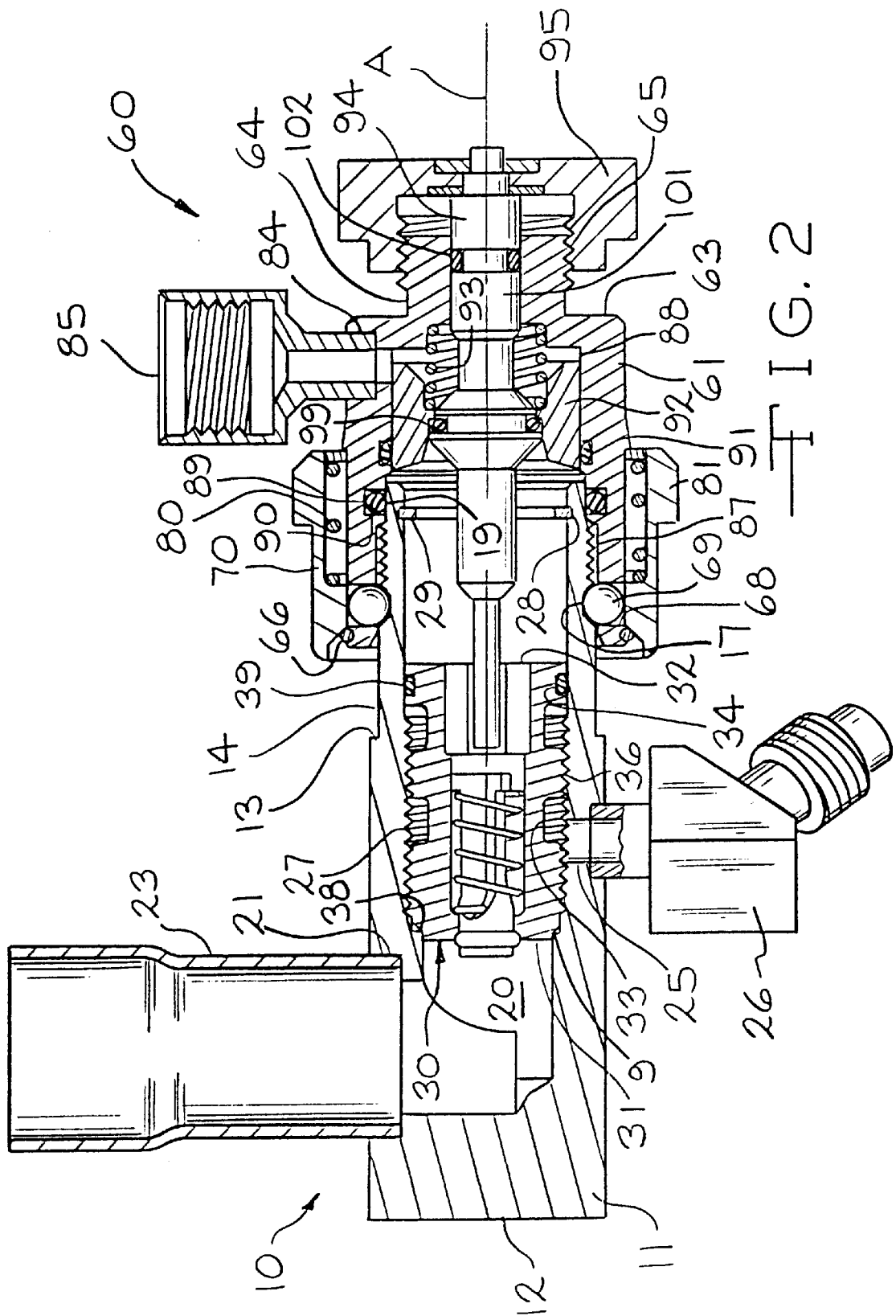
FIG. 2 is a sectional view showing the process valve connected to the female member such as a service adapter with the process valve having both its primary valve stem and internal secondary valve-in-valve poppet in the sealed position and the service valve also in a sealed position.

Internally, the valve stem 30 is provided with hexagonal flats 35 to receive a tool such as an Allen wrench to effect rotation of the valve stem 30 and its threads 36 engaged to the internal threads 27 to effect axial movement thereof in the housing 11 from the position shown in FIG. 1 permitting fluid flow between the first process opening 21 and the second process opening 22 to the position shown in FIG. 2 closing fluid flow between such process openings 21 and 22. The portion of the valve stem 30 immediate adjacent the sealing end 31 is sized to fit within a constricted area 18 of the housing. The valve stem 30 has an angled shoulder 38 spaced a short distance from the sealing end 31 which engages the shoulder 9 of the housing 11 adjacent the constricted area 18 to limit the adjustment of the valve stem 30 toward the closed end 12. When so positioned, the valve stem 30 seals communication between the first process opening 21 and second process opening 22.

The valve stem 30 has a passageway 41 extending axially between the adjustment end 32 and the sealing end 31. A radially inwardly extending constriction 42 defines an annular sealing surface 45 adjacent the sealing end 31 and a shoulder 44 spaced therefrom (See FIG. 6). The portion of the passageway 41 between the shoulder 44 and the hexagonal flats 35 is cylindrical. The passageway 41 could have a cross-sectional configuration other than circular.

Positioned in the passageway 41 is a poppet generally designated by the numeral 40. The poppet 40 extends along the axis A from a nose 46 to a tail 47. Adjacent the nose 46 is an annular groove 48 in which is received an annular seal 50 sized to sealingly engage the sealing surface 45 of the valve stem 30. The portion of the poppet 40 between the annular groove 48 and the tail 47 is contoured to define three wings 51, each positioned approximately 120° from the other as viewed in cross-section and extending outwardly from a central portion. The wings 51 are enlarged radially at the end adjacent the tail 47 to define radial shoulders 53 and outer portions 52. The outer portions 52 of such enlarged areas of the wings 51 define a radial size permitting the poppet 40 to be axially moveable in the cylindrical portion of passageway 41 with contact between such outer surfaces 52 and the wall defining the cylindrical portion of passageway 41 maintaining the tail 47 end of the poppet 40 axially aligned. Encircling the wings is a compression spring 54 having one end abutting the shoulders 53 and the other end abutting the shoulder 44. As a result of the compression spring 54 pushing against the shoulders 53 of the enlarged portions of the wings 51 while the opposing end of the spring is engaged to the shoulder 44, the poppet 40 will be yieldingly urged toward the adjustment end 32 thereby causing the annular seal 50 to be sealingly engaged with the sealing surface 45 at the sealing end 31. The spring 54 and the constriction 42 maintain the portion of the poppet adjacent the nose 46 axially aligned.

Figure 3:
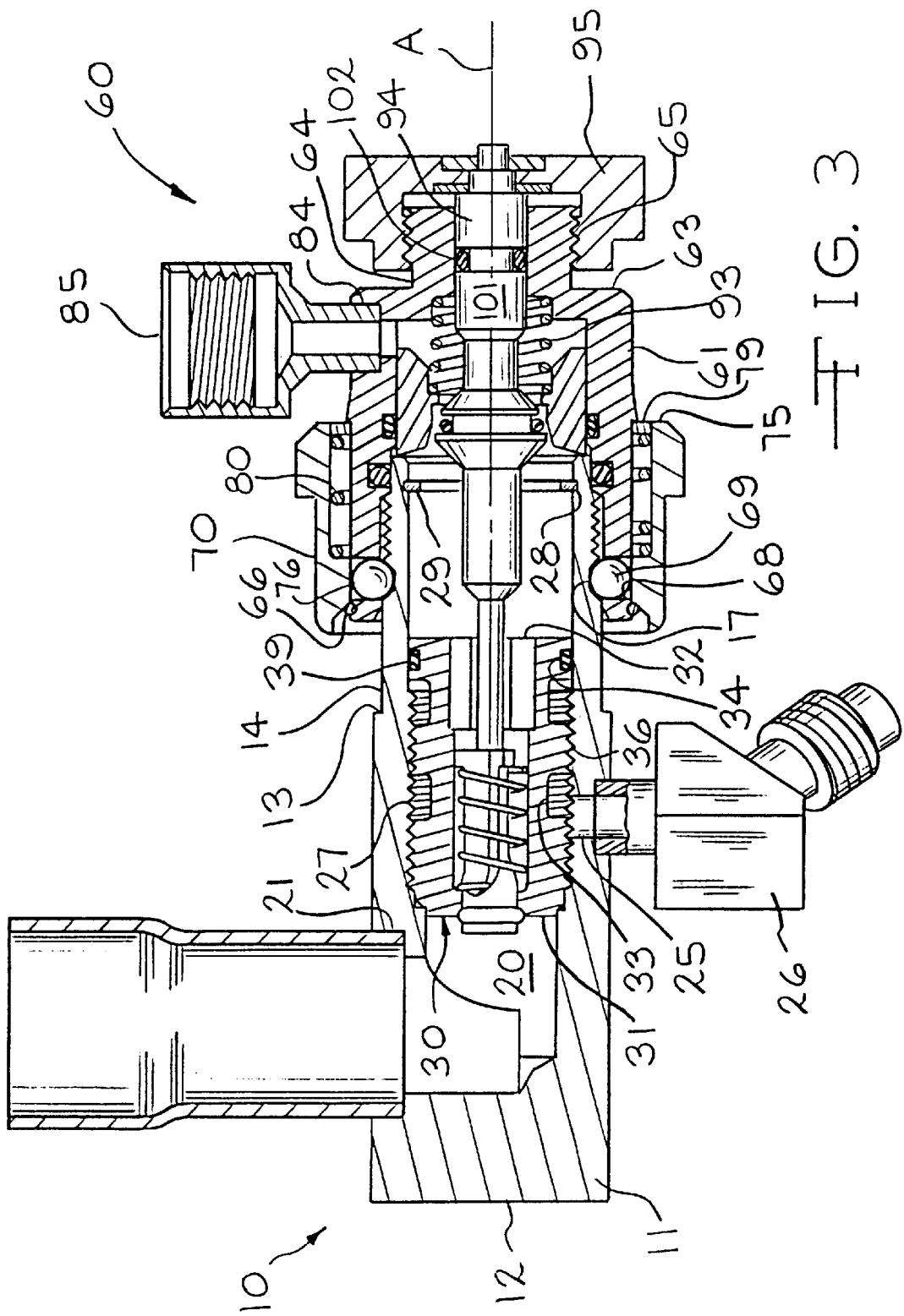
FIG. 3 is a view similar to FIG. 2 showing the service valve following axial adjustment of its axially extending actuator to an open position but prior to movement of the valve-in-valve poppet to an open position.

Referring specifically to FIGS. 2 through 4, a female member such as a service adapter 60 is provided which has both (1) a quick release feature for rapid engagement with and disengagement from the process valve 10 and (2) a manually adjustable feature. The service adapter 60 includes a main body portion 61 extending from an engagement end 62 to an adjustment end 63. Extending from and integral with the main body portion 61 is a tubular segment 64 having outwardly facing threads 65. The exterior surface of the main body portion 61 in the area adjacent the engagement end 62 and extending throughout a major portion of its axial extent is cylindrical. The body 61 is provided with an outwardly extending shoulder 67 in a central axial portion and an outwardly facing annular groove adjacent the engagement end 62 in which is positioned a retaining ring 66. The retaining ring 66 extends radially outwardly a short distance beyond the outer surface of the adjacent main body portion 61.

The main body portion 61 is provided with a plurality of apertures 68, preferably eight in number, in which are positioned spherical balls 69, one ball in each aperture 68. The size of the apertures 68 at the inner surface of the body wall is slightly smaller than the diameter of the balls 69 in order that the balls will not pass completely therethrough. The size of the apertures 68 at the exterior surface is larger than the diameter of the balls and the diameter of the balls 69 is greater than the thickness of the body wall in the area of the apertures 68. As a result, the balls 69 can extend inwardly toward the axis A from the interior surface but will not pass completely through the apertures 68 toward the axis.

Encircling the main body portion 61 in the area of the engagement end 62 is a release sleeve 70. The release sleeve 70 is axially moveable from the position shown in FIGS. 2, 3 and 4, which is the lock position, to the position shown in FIG. 2A which is the release position. The release sleeve 72 extends from a forward end 74 to a rear end 75. The sleeve 72 has a thickened wall portion extending to a cylindrical inner surface 76 sized to permit slideable engagement with the outer surface of the cylindrical exterior surface of the body 61 in the area adjacent the engagement end 62. The enlargement defines an abutment 77 at the forward end of the enlargement and a shoulder 78 at the rear end of the enlargement. The abutment 77 is sized to engage the retaining ring 66 to thereby limit axial movement of the release sleeve 70 in the forward direction. A washer 79 encircles the body portion 61 in abutting relationship with the outwardly extending shoulder 67. A compression spring 80 is positioned in the space between the body portion 61 and the release sleeve 70 and has one end engaged to the shoulder 78 and the other end engaged to the washer 79. The spring 80 thus yieldingly urges the release sleeve 70 forwardly toward the engagement end 62. When the release sleeve 70 is at its maximum forward position with the abutment 77 in contact with the retaining ring 66, the inner surface 76 will overlie the apertures 68 and hold the balls 69 in their radially inward-most position engaged to the annular groove 17 of the process valve 10. The amount of space taken up axially by the spring 80 in the cavity between the shoulder 78 and the washer 79 when the release sleeve 70 is at its maximum retracted position is such that the forward end 74 will at least partially overlie the apertures 68 to prevent the balls 69 from falling completely out of the main body portion.

Figure 2A:
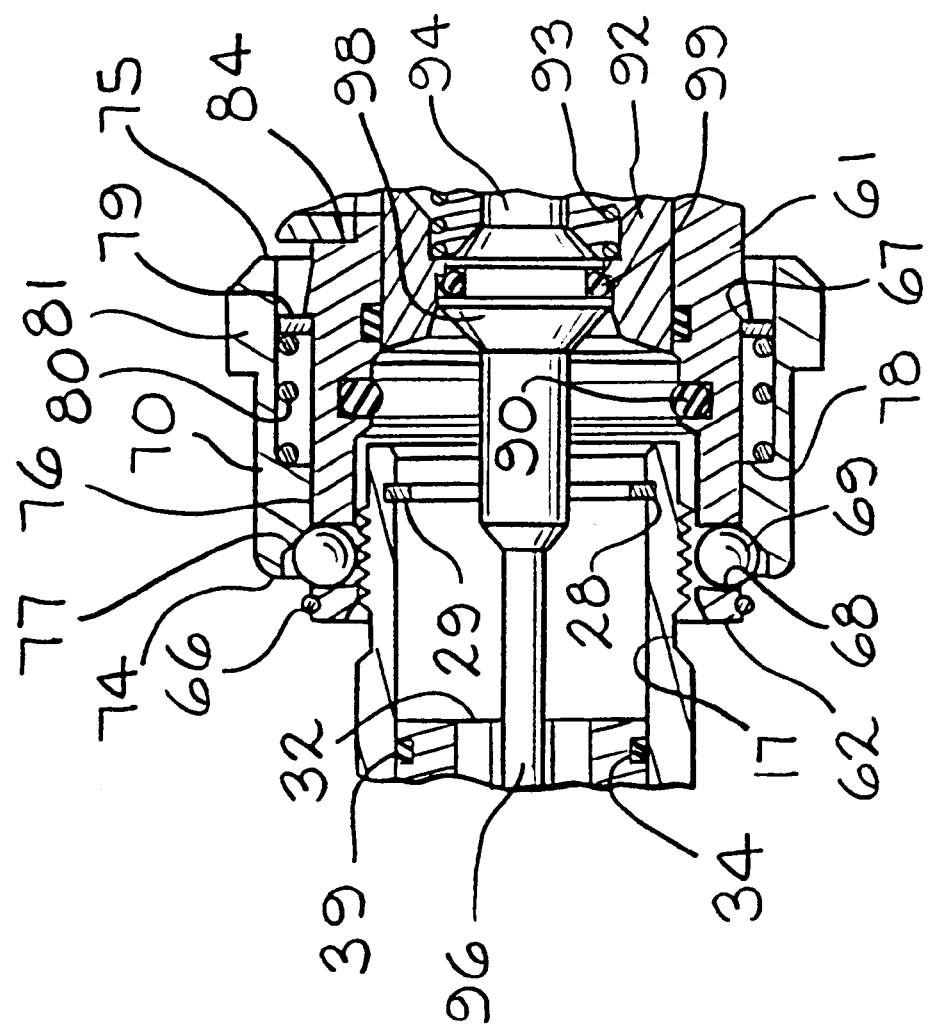
FIG. 2A is a fragmentary view of portions of the joined members of FIG. 2 with the release sleeve retracted to a release position.

The release sleeve 70 is provided with an outwardly extending finger grip 81 adjacent the rear end 75. When it is desired to engage or disengage the service adapter 60 to or from the process valve 10, it is necessary simply to retract the release sleeve 70 axially toward the adjustment end 63 so that the inner surface 76 of the enlargement no longer overlies the apertures 68 thereby permitting the balls 69 to move radially outwardly as shown in FIG. 2A. With the balls 69 free to move radially outwardly, the process valve 10 can be removed from or positioned into engagement with the service adapter 60.

The main body portion 61 has a radially outwardly extending port 84 adjacent the adjustment end 63. Brazed or otherwise secured in the port 84 is a fitting 85 having a tubular portion 82 and an enlarged internally threaded portion adapted to be connected to a supply of refrigerant or other fluid.

Internally, the main body portion 61 has a first inwardly facing cylindrical wall surface 87, a second inwardly facing cylindrical wall portion 88 spaced therefrom with an annular groove 89 positioned therebetween. An annular seal 90 is positioned in the annular groove 89. As can be seen in FIG.

2, when the process valve 10 is engaged to the service adapter surface 60, the cylindrical outwardly facing wall surface 19 is sealingly engaged to the annular seal 90.

A second inwardly facing annular groove 91 is formed in the second inwardly facing wall surface 88 and also has an annular seal positioned therein. Positioned in slideable engagement with the second cylindrical wall surface 88 is a sleeve valve 92. The sleeve valve 92 is yieldingly urged toward the engagement end 62 of the body 61 by a compression spring 93 positioned between it and an internal recess at the adjustment end 63 of the body. Axially positioned in the body 61 is an actuator 94 having an adjustment knob 95 threadedly engaged to the threads 65 of the tubular segment 64. The actuator 94 includes a probe 96 extending axially beyond the engagement end 62. The central portion of the actuator 94 has an enlarged valve 98 including an annular groove in which is positioned an annular sealing ring 99 sized to sealing engage the inner-most portion of the sleeve valve 92. The enlarged portion of the valve 98 and the sealing ring 99 limit the extent to which the sleeve valve 92 may be urged toward the engagement end 62 by the compression spring 93.

Rearwardly of the sealing ring 99, the actuator 94 has a post 101 with an annular groove in which is position yet another annular seal 102 which sealingly engages the post 101 to the interior surface of the tubular segment 64. The post 101 is engaged to the adjustable knob 95 by conventional means permitting the knob to rotate without causing rotation of the actuator but causing axial movement of the actuator as the knob moves axially upon rotation of its threads relative to the threads 65 of the tubular segment.

Figure 9:
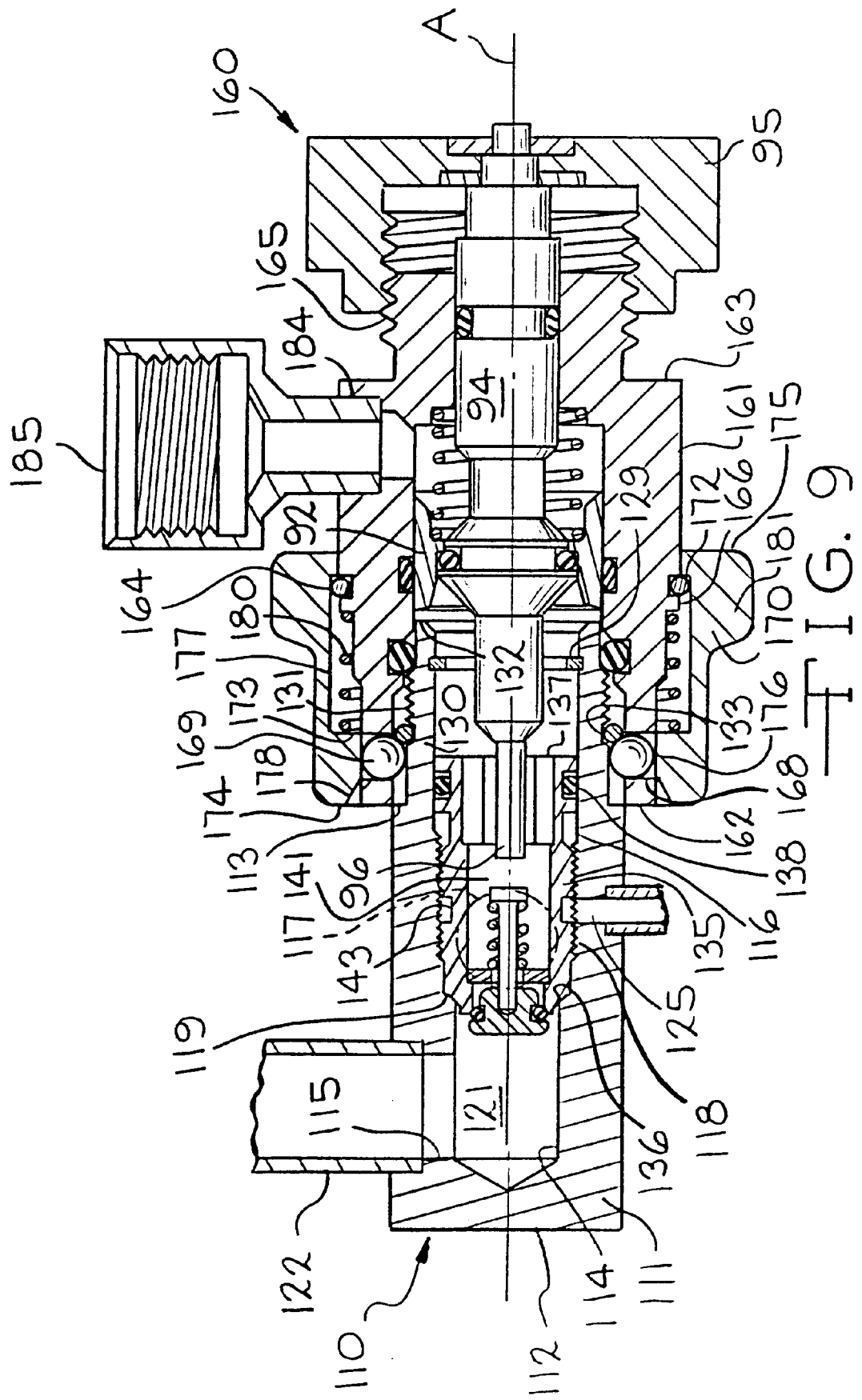
FIG. 9 is a sectional view of the modified process valve and service valve of FIG. 8.

Referring now to FIGS. 8 through 11, there is shown a modified embodiment which is particularly suitable for smaller sizes, for example, sizes of ¼ inch or smaller as measured by the diameter of the poppet. As shown in FIGS. 8 and 9, there is provided a process valve generally designed by the numeral 110 and a service adapter generally designated by the numeral 160. The process valve 110 includes a housing 111 extending from a first closed end 112 to a second end 113. The housing 111 has a first inwardly facing cylindrical wall surface 114 with a first radial port 115 extending therefrom and a second inwardly facing wall surface 116 with a second radial port 117 extending therefrom. The second inwardly facing wall surface 116 includes a threaded portion 118. A sealing shoulder 119 connects the first inwardly facing cylindrical wall surface 114 with the second inwardly facing wall surface 116. A chamber 121 extending along axis A is defined by the first inwardly facing cylindrical wall surface 114 and the second inwardly facing wall surface 116.

A first length of conduit 122 extends from the first port 115 and a second length of conduit 123 extends from the second port 117. The body also includes an aperture 125 communicating with the chamber 121. A Schrader valve 126 is connected to the body at the aperture 125. A tubular extension 130 having outwardly facing threads 131 extends from the housing end 113 to an open end 132. On the opposite side of the threads 131 from the open end 132 is an outwardly facing annular groove in which is positioned a retaining ring 133. In lieu of ring 133, the body itself could have an integral annular ridge extending outwardly.

Positioned within the chamber 121 is a valve stem 135 having outwardly facing threads 144 engaging the internal threaded portion 118. The valve stem 135 extends along the axis A from a sealing end 136 sized to become sealingly engaged with the sealing shoulder 119 to an adjustment end 137 and has formed therein an outwardly facing annular channel 143. An outwardly facing annular groove 138 is positioned adjacent the adjustment end 137. An annular seal 139 is positioned in the annular groove 138 and is sealingly engaged with the second inwardly facing wall surface 116. An annular thread relief 134 is formed between the end of the threads 144 and the annular groove 138.

Internally, the valve stem 135 is provided with a series of hexagonal flats 141 adjacent the adjustment end 137 to receive a tool such as an Allen wrench to effect rotation of the valve stem 135 and axial movement thereof from the closed position shown in FIG. 9 to an open position with the sealing end 136 in axially spaced relation with the sealing shoulder 119 to permit free flow of fluid between the first port 115 and the second port 117. The housing 111 has an inwardly facing annular groove in which is positioned a retaining ring 129 to limit movement of the valve stem 135 toward the open end 132.

The valve stem 135 also has a chamber 146 in the area between the series of hexagonal flats 141 and the sealing end 136. A radially inwardly extending shoulder 147 is spaced axially a short distance from the sealing end 136. A retainer 150 having a circular portion defining an aperture 151 and a plurality of four outwardly extending legs 152 is positioned in the chamber 146 in abutting relationship with the shoulder 147. An axially moveable post 154 having an enlarged head 155 extends through the aperture 151. The portion of the retainer 150 defining the aperture 151 and the spring 158 maintain the post axially aligned when the post 154 is moved to the open position, namely, to the left as viewed in FIGS. 9 and 10. The end of the post 154 opposite the head 155 has mounted thereon a cap 156. The cap 156 has an annular groove in which is position an annular seal 157 sized to become sealingly engaged with the valve stem 135 adjacent the sealing end 136. Encircling the post 154 and captured between the enlarged head 155 and the retainer 150 is a compression spring 158. The compression spring yieldingly urges the post 154 toward the right as viewed in FIGS. 9 and 10 so that the annular seal 157 is normally in sealing relationship with the valve stem 135. Movement of the post 154 to the left as viewed in FIGS. 9 and 10, against the biasing action of the spring 158 opens the seal between the annular seal 157 and the valve stem 135 thereby permitting the flow of fluid from the chamber 121 of the housing 111 through the chamber 146 and remaining portion of the valve stem 135.

As shown in FIG. 9, there is provided a service adapter 1 60 having an axially movable quick release sleeve 170 and related components for rapidly engaging and disengaging the service adapter 160 to the process coupling 110.

The service adapter 160 includes a main body portion 161 extending from an engagement end 162 to an adjustment end 163. Extending from and integral with the main body portion 161 is a tubular segment having outwardly facing threads 1 65. The body 161 in the area adjacent the engagement end 162 has a first cylindrical exterior surface followed by an outwardly tapering surface 159 extending to a second, larger cylindrical surface. The body is provided with a plurality of apertures 168, extending through the body wall at the first cylindrical surface, in which are positioned spherical balls 169. The size of the apertures 168 at the inner surface of the body wall is slightly smaller than the diameter of the balls in order that the balls 169 will not pass completely therethrough. The size of the apertures 168 at the exterior surface of the body wall is larger than the diameter of the balls and the diameter of the balls 169 is greater than the thickness of the body wall in the area of the apertures 168. As a result, the balls 169 can extend inwardly toward the axis A from the interior surface but will not pass completely through the apertures 168 toward the axis A.

The body 161 is provided with an outwardly facing annular groove approximately midway between the engagement end 162 and the adjustment end 163 in which is positioned a retaining ring 164. The retaining ring 164 extends radially outwardly a short distance beyond the outer surface of the adjacent main body portion 161. An outwardly extending flange 166 defines one side of the annular groove.

Encircling the main body portion 161 in the area of the engagement end 162 is a release sleeve 170. The release sleeve 170 extends from a forward end 174 to a rear end 175 and is axially moveable from the forward position shown in FIG. 9, which is the engagement position, rearwardly toward the adjustment end 163 to the release position. The sleeve 170 has a thickened wall portion extending to a cylindrical inner surface 176 sized to permit slideable engagement with the outer surface of the cylindrical exterior surface of the body 161 in the area adjacent the engagement end 162 and a recessed wall portion having an interior surface 177 which is spaced from the exterior surface of the main body portion 161. A flange extends radially inwardly from the recessed wall portion interior surface 177 and defines a first shoulder 172 engageable with the retaining ring 164 to limit forward movement of the sleeve 170 toward the engagement end 162 of the body 161. A second shoulder 173 is defined at the rear side of the thickened wall portion adjacent the cylindrical inner surface 176. A compression spring 180 is positioned in the space between the body portion 161 and the release sleeve 170 and has one end engaged to the second shoulder 173 and the other end engaged to the flange 166. The spring 180 thus yieldingly urges the release sleeve 170 forwardly toward the engagement end 162. When the release sleeve 170 is at its maximum forward position with the shoulder 172 in contact with the retaining ring 164, the cylindrical inner surface 176 of the thickened portion will overlie the apertures 168 and hold the balls 169 in their radially inward-most position engaged to the retaining ring 133 or other outwardly extending ridge of the process valve 110.

The release sleeve 170 is provided with an outwardly extending finger grip 181 adjacent the rear end 175. When it is desired to engage or disengage the service adapter 160 to or from the process valve 110, it is necessary simply to retract the release sleeve 170 axially toward the adjustment end 163 so that the cylindrical inner surface 176 no longer overlies the apertures 168 with the result that the balls 169 are permitted to move radially outwardly. With the balls 169 free to move radially outwardly, the process valve 110 can be removed from or positioned into engagement with the service adapter 160. The sleeve 170 is provided with a cam surface 178 tapering outwardly from the cylindrical inner surface 176 to the forward end 174 to prevent the balls from falling completely out of the service adapter 160. Engagement of the second shoulder 173 against the outwardly tapering surface 159 limits the extent of retraction of the sleeve 170 to insure that the cam surface 178 will prevent the balls 169 from falling completely out of the apertures 168.

The main body portion 161 has a radially outwardly extending port 184 adjacent the adjustment end. Brazed or otherwise secured to the port 184 is a fitting 185 having an extended portion adapted to be connected to a supply of refrigerant or other fluid.

Internally the main body portion 161 and the tubular segment extending therefrom have components positioned therein, including sleeve valve 92 and actuator 94 with its axially extending probe 96, which are substantially the same as those described with respect to the embodiments of FIGS. 2–4 and will not be described in detail except to state that upon rotation of the adjustment knob 95 to cause axial movement of the actuator 94 toward the left as viewed in FIG. 9, the probe will engage the enlarged head 155 of the axially moveable post 154 of the valve stem 135 of the process valve 110 thereby causing the cap 156 and its annular seal 157 to become disengaged from the sealing end 136 to thereby open the valve stem 135.

When it is desired to release the service adapter 160 from the process valve 110, it is simply necessary to retract the release sleeve 170 toward the adjustment end 163, for example by gripping the finger grip 181. Such movement causes the cylindrical inner surface 176 to be moved axially out of alignment with the balls 169 thereby permitting the balls 169 to move radially outwardly a sufficient distance such that a circle defined by the inner-most portions of the released balls 169 is greater than the diameter of a circle defined by the outer-most portion of the retaining ring 133 so that the process valve 110 with its retaining ring 133 can be withdrawn from the service adapter 160.

Although the service adapters 60 and 160 have shown with rotatable knobs 95 to effect movement of their respective actuators and pins 94, 96 it is possible to use a simple push-pull actuator and pin for moving the poppet 40 or the post 154.

Additionally, although the present invention has been described with a service adapted utilizing a latch having a release sleeve with balls retained in a retention groove of the process coupling, other well known types of latches such as arc latch connect or bar/pin connection-type latches could also be used as well as threaded connections.

Figure 12:
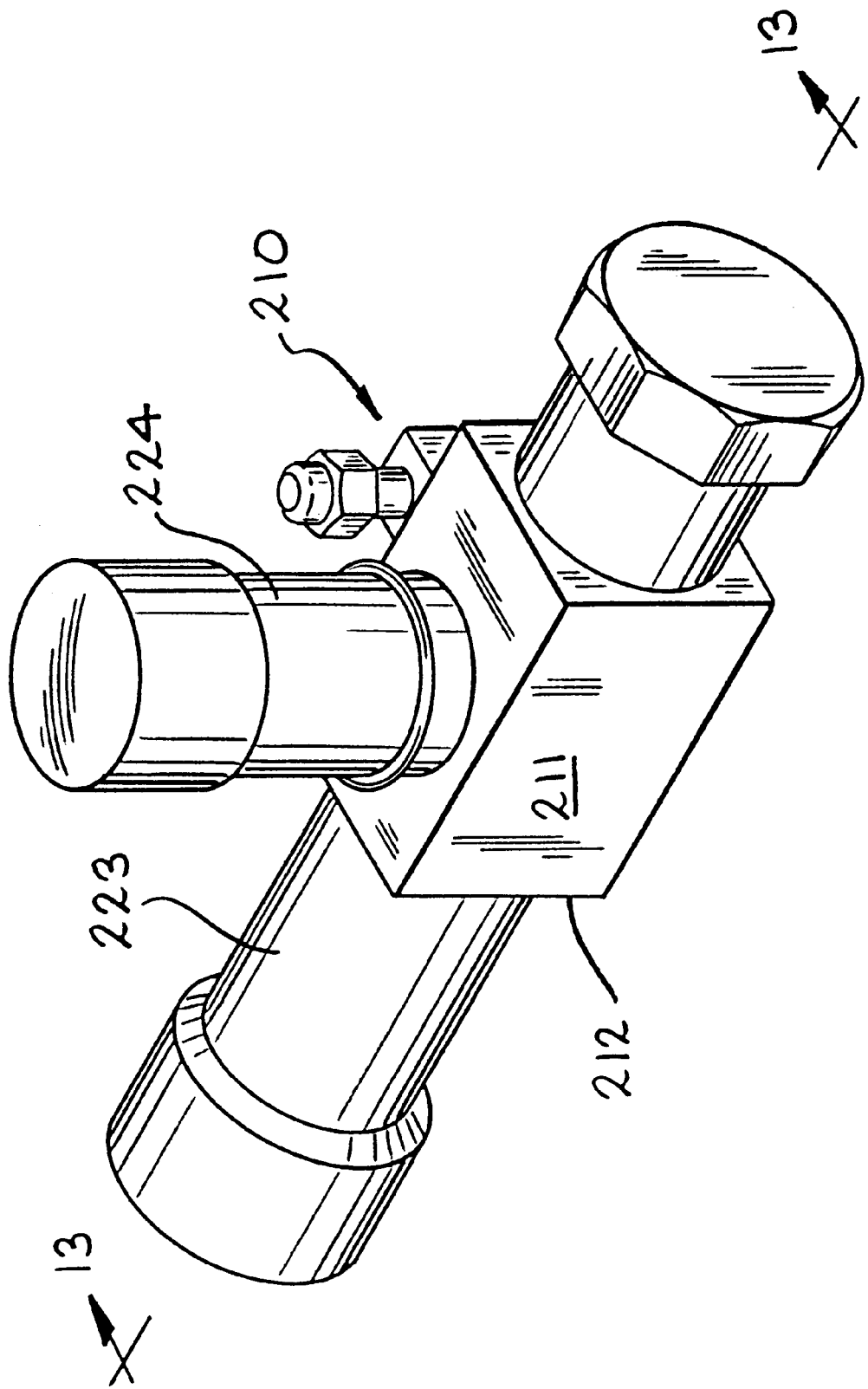
FIG. 12 is a perspective view of a modified process valve.
Figure 13:
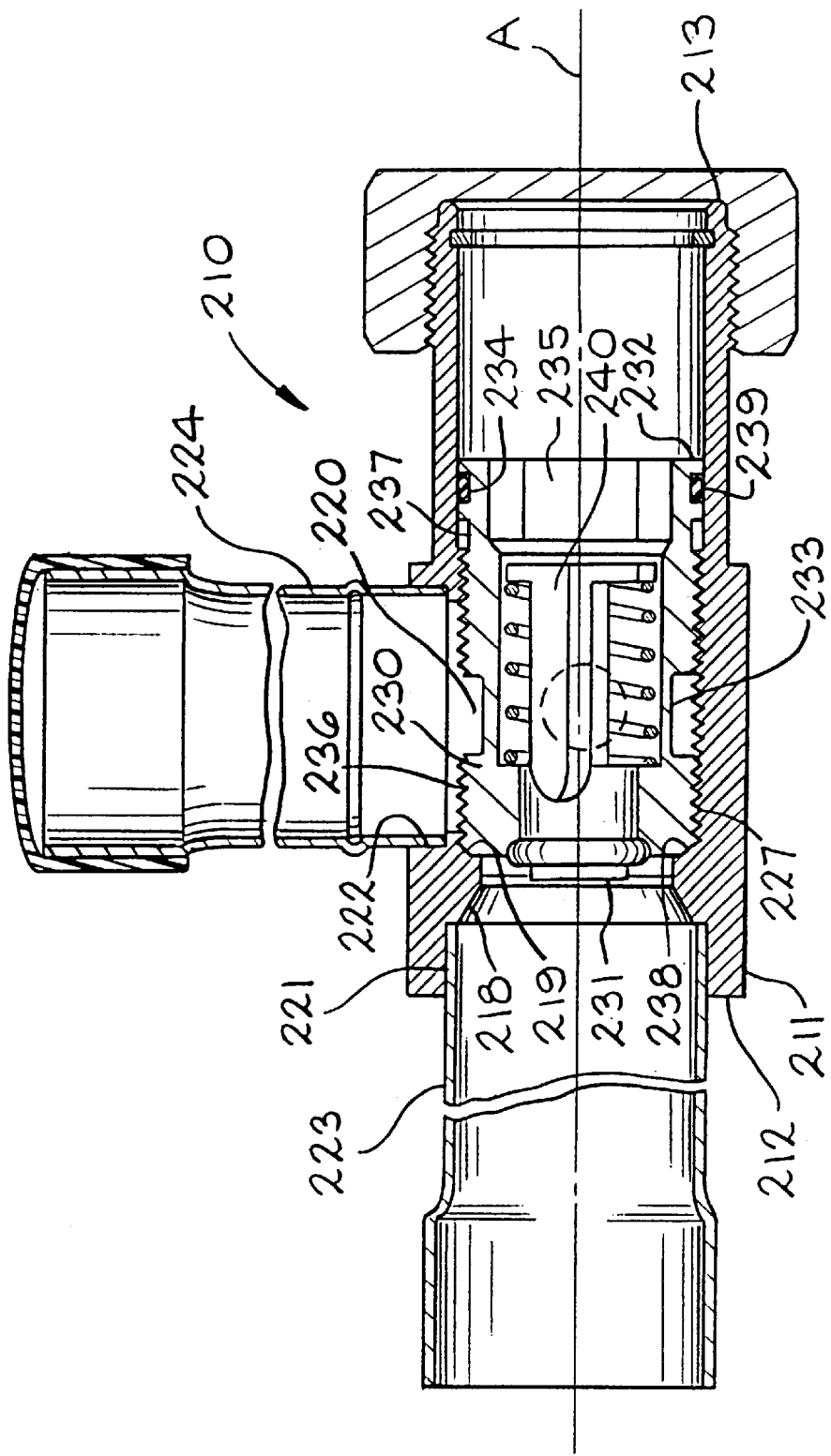
FIG. 13 is a sectional view of the modified process valve of FIG. 12.

Referring to FIGS. 12 and 13 there is shown a modified process valve 210 having a housing 211 extending along axis A from a first end 212 to a second end 213. Contrary to the embodiment of FIGS. 1–7 in which the housing 11 has its first end 12 closed, both the first end 212 and second end 213 of the housing 211 are open. The first end 212 defines a first process opening 221 and has a first length of conduit 223 brazed or otherwise connected to the housing 211 at such first end 212 for communication with the factory installed portion of an HVAC system.

A second process opening 222 is formed in the housing 211 at substantially right angles to the axis A. A second length of conduit 224 for communicating with the field side of an HVAC system is brazed or otherwise connected to the second process opening 222.

Internally, the housing 211 has a central chamber 220 which communicates with the first and second process openings 221 and 222 and with the open second end 213.

The housing has internal threads 227. A portion of the housing 211 adjacent the threads 227 and spaced a short distance from the first end 212 defines a constriction 218 with a shoulder 219. Positioned within the chamber 220 is valve stem 230 having outwardly facing threads 236 engaged to the internal threads 227 of the housing 211. The valve stem 230 extends along the axis A from a sealing end 231 to an adjustment end 232 and has formed therein an outwardly facing flow channel 233.

An annular thread relief 237 is formed between the end of the threads 236 and the adjustment end 232. An outwardly facing annular groove 234 is positioned between the thread relief 237 and the adjustment end 232 and has an O-ring 239 positioned therein to effect an annular seal between the valve stem 230 and the internal surface of the housing 211.

Internally, the valve stem 230 is provided with hexagonal flats 235 to receive a tool such as an Allen wrench to effect rotation of the valve stem 230 and its threads 236 engaged to the internal threads 227 to effect axial movement thereof in the housing 211 from the position shown in FIG. 13 closing fluid flow between the first process opening 221 and the second process opening 222 to an open position permitting fluid flow between such process openings 221 and 222. The valve stem 230 has a shoulder 238 adjacent the sealing end 231 which engages the shoulder 219 of the housing 211 adjacent the constriction. When so positioned, the valve stem 230 seals communication between the first process opening 221 and second process opening 222.

A poppet 240 similar to the poppet 40 of the embodiment of FIGS. 1–7 is positioned in the valve stem 230 and will not be described further. Alternatively, the modified valve stem 135 of the embodiment of FIGS. 8–11 could be utilized.

Many modifications will become apparent to those skilled in the art. Accordingly, the scope of the present invention shoulder be limited only by the scope of the claims.

We claim:

1. A valve assembly comprising:
   (a) a coupling member having
      (1) a body with a passageway extending along an axis from an open end and first and second ports communicating with said passageway, at least one of said ports being positioned outwardly of said axis, said first port being spaced axially from said second port, an outwardly facing retention abutment adjacent said open end, an internal annular sealing surface positioned axially between first port and said second port and an outwardly facing annular sealing surface between said retention abutment and said open end; and
      (2) a valve stem extending from a leading end to a trailing end axially movable in said passageway from a forward position to a rearward position and including
         (i) an external sealing surface in the vicinity of said leading end engageable with said internal annular sealing surface when in said forward position to prevent the flow of fluid between said first port and said second port,
         (ii) a central channel extending from said leading end to said trailing end,
         (iii) a poppet axially movable in said central channel having an annular seal engageable with said leading end and extending toward said trailing end to an actuation end,
         (iv) a first spring yieldingly urging said poppet toward said trailing end to cause said annular seal to sealingly engage said leading end to prevent the flow of fluid through said central channel; and
   (b) a service adapter having
      (1) a body extending along an axis from a receiving end to an opposing end, said body having an exterior surface substantially parallel to said axis in the area of said receiving end, an interior surface sized to receive said coupling member retention abutment, a plurality of apertures spaced from said receiving end and an annular seal extending inwardly from said interior surface on the opposite side of said apertures from said open end engaged to said coupling member body outwardly facing annular sealing surface;
      (2) a release sleeve encircling said exterior surface extending from a forward end in the vicinity of said body receiving end to a rear end, said release sleeve having a first internal surface slideably engaged to said body exterior surface, a second internal surface spaced from said body exterior surface and a shoulder therebetween;
      (3) engagement members in said apertures moveable radially inwardly and outwardly from a first position extending inwardly of said interior surface to engage said coupling member retention abutment to a second outward position disengaged from said coupling member retention abutment;
      (4) a second spring having a first end supported by said shoulder yieldingly urging said release sleeve to a location at which said first internal surface overlies said apertures and retains said retention members in said first position, movement of said sleeve rearwardly against the yielding action of said second spring disengaging said sleeve first internal surface from said retention members and permitting said retention members to move to said second position; and
      (5) an axially extending actuator engageable with said poppet actuation end and axially moveable from a retracted position to an extended position moving said poppet axially to disengage said poppet annular seal from said valve stem leading end.

2. A valve assembly according to claim 1, wherein said first port is positioned outwardly of said axis and said second port lies on said axis.

3. A valve assembly according to claim 1, wherein said second spring has a second end and said service adapter body has an abutment associated therewith supporting said second spring second end, said abutment extending outwardly radially beyond said body exterior surface.

4. A valve assembly according to claim 3, further including a washer between said second spring second end and said abutment.

5. A valve assembly according to claim 1, wherein said service adapter body has a retainer between said receiving end and said apertures, said retainer extending outwardly beyond said body exterior surface to limit axial movement of said sleeve away from said opposing end.

6. A valve assembly according to claim 5, wherein said retainer comprises a ring positioned in a groove in said service adapter body, said groove positioned between said receiving end and said apertures.

7. A valve assembly according to claim 3, wherein said service adapter body has a retainer between said receiving end and said apertures, said retainer extending outwardly beyond said exterior surface to limit axial movement of said sleeve away from said opposing end.

8. A valve assembly according to claim 3, wherein said service adapter sleeve has an inwardly directed flange adjacent said rear end, said flange defining (i) a cylindrical inner surface facing said service adapter body and (ii) a shoulder, and said service adapter body has (1) an annular groove between said abutment and said opposing end and (2) a retaining ring positioned in said groove extending radially outwardly beyond said flange inner surface, engagement of said flange against said retaining ring limiting axial movement of said sleeve away from said opposing end.

9. A valve assembly according to claim 1, wherein said valve stem has first and second sets of outwardly facing threads and an annular channel between said first set and said second set.

10. A valve assembly according to claim 1, wherein said valve stem central channel has an inwardly extending shoulder spaced from said leading end, said poppet has an outwardly extending flange and said first spring encircles said poppet between said shoulder and said flange.

11. A valve assembly according to claim 10, wherein said valve stem central channel is defined in part by an annular wall portion and said poppet includes a plurality of wings extending outwardly from a central portion and at least one of said wings has said outwardly extending flange, said flange cooperating with said annular wall portion to maintain axial alignment of said poppet.

12. A valve assembly according to claim 10, wherein said poppet includes (i) a post and said flange extends from said post and (ii) a retainer encircling said post and engaging said inwardly extending shoulder, and said first spring encircles said post between said shoulder and said flange.

13. A valve assembly according to claim 12, wherein said retainer includes an annular surface defining an aperture through which said post extends, said annular surface cooperating with said post to maintain axial alignment of said post.

14. A valve assembly comprising:
(a) a coupling member having
  (1) a body with a passageway extending along an axis from an open end and first and second ports communicating with said passageway, at least one of said ports being positioned outwardly of said axis, said first port being spaced axially from said second port, an outwardly facing retention abutment adjacent said open end, an internal annular sealing surface positioned axially between first port and said second port and an outwardly facing annular sealing surface between said retention abutment and said open end; and
  (2) a valve stem extending from a leading end to a trailing end axially movable in said passageway from a forward position to a rearward position and including
    (i) an external sealing surface in the vicinity of said leading end engageable with said internal annular sealing surface when in said forward position to prevent the flow of fluid between said first port and said second port,
    (ii) a central channel extending from said leading end to said trailing end,
    (iii) a poppet axially movable in said central channel having an annular seal engageable with said leading end and extending toward said trailing end to an actuation end,
    (iv) a spring yieldingly urging said poppet toward said trailing end to cause said annular seal to sealingly engage said leading end to prevent the flow of fluid through said central channel;
    (v) said valve stem central channel having a first surface and said poppet having a second surface, said first surface and said second surface being slidably engageable to maintain axial alignment of said poppet; and
(b) a service adapter having
  (1) a body extending along an axis from a receiving end to an opposing end, said body having an interior surface sized to receive said coupling member retention abutment, and an annular seal extending inwardly from said interior surface engaged to said coupling member body outwardly facing annular sealing surface;
  (2) engagement means for engaging said coupling member retention abutment, and
  (3) an axially extending actuator engageable with said poppet actuation end and axially movable from a retracted position to an extended position moving said poppet axially to disengage said poppet annular seal from said valve stem leading end.

15. A valve assembly according to claim 14, wherein said coupling member body has an outwardly facing annular sealing surface between said retention abutment and said open end.

16. A valve assembly according to claim 14, wherein said first port is positioned outwardly of said axis and said second port lies on said axis.

17. A valve assembly according to claim 14, wherein said valve stem has first and second sets of outwardly facing threads and an annular channel between said first set and said second set.

18. A valve assembly according to claim 14, wherein said valve stem central channel has an inwardly extending shoulder spaced from said leading end, said poppet has an outwardly extending flange and said first spring encircles said poppet between said shoulder and said flange.

19. A valve assembly according to claim 14, wherein said valve stem central channel is defined in part by an annular wall portion and said poppet includes a plurality of wings extending outwardly from a central portion and at least one of said wings has said outwardly extending flange, said flange cooperating with said annular wall portion to maintain axial alignment of said poppet.

20. A valve assembly according to claim 14, wherein said poppet includes (i) a post and said flange extends from said post and (ii) a retainer encircling said post and engaging said inwardly extending shoulder, and said first spring encircles said post between said shoulder and said flange.

21. A valve assembly according to claim 20, wherein said retainer includes an annular surface defining an aperture through which said post extends, said annular surface cooperating with said post to maintain axial alignment of said post.

* * * * *